Jan. 18, 1955 N. H. SAUNDERS 2,700,072
CONFERENCE PROVISION FOR TELEPHONE SWITCHBOARDS
Filed Sept. 11, 1953
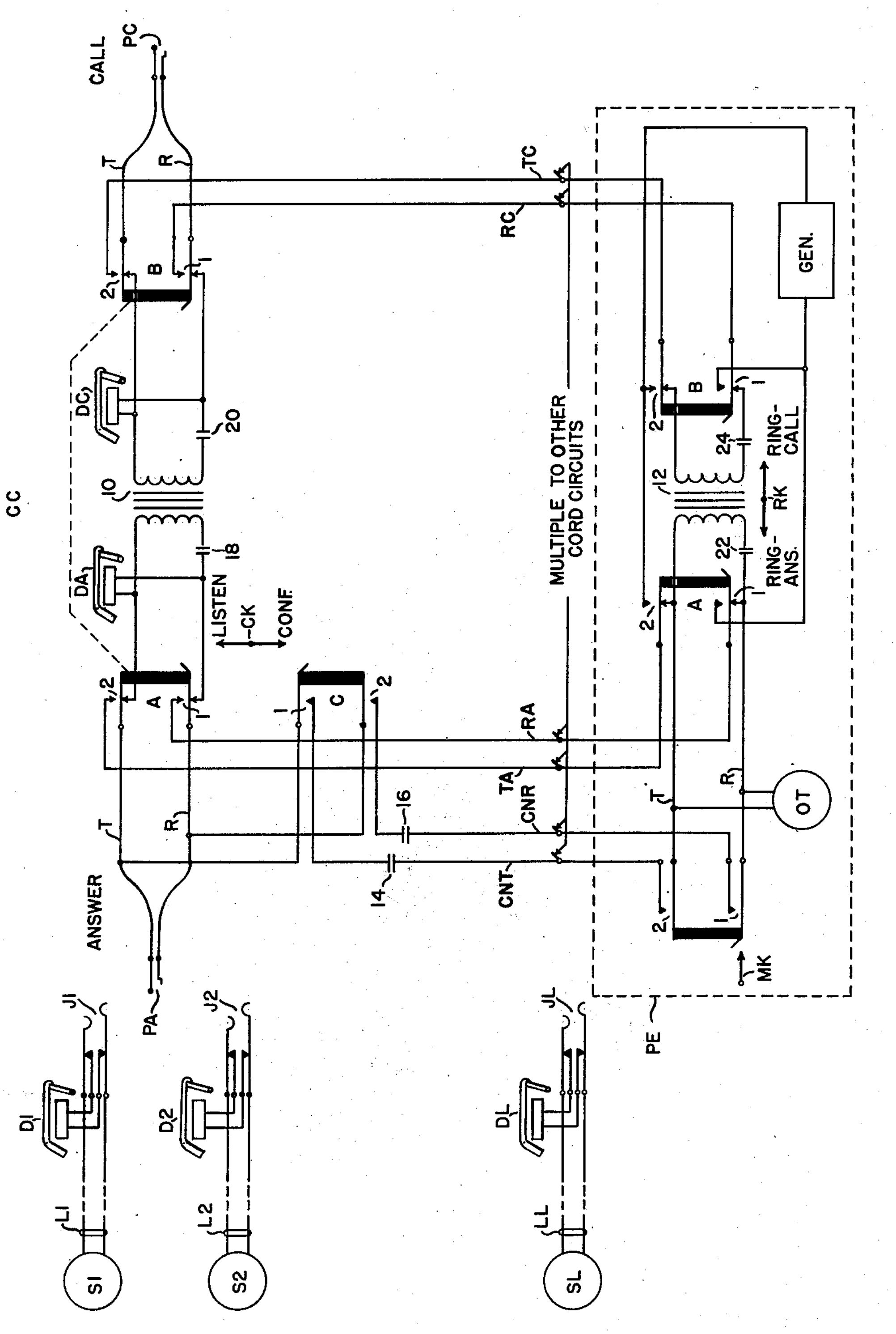

United States Patent Office 2,700,072

Patented Jan. 18, 1955

2,700,072

CONFERENCE PROVISION FOR TELEPHONE SWITCHBOARDS

Norman H. Saunders, Chicago, Ill., assignor to International Telephone and Telegraph Corporation, a corporation of Maryland Application September 11, 1953, Serial No. 379,542

3 Claims. (Cl. 179—51)

This invention relates to conference provisions for a telephone switchboard. Its general object is to provide satisfactory and economical means in a telephone switchboard for effecting a conference connection among such lines as may be desired from time to time.

*General description*

Particularly on private and private branch switchboards, switchboard provisions are often desirable for establishing conference connections, being connections among more than two lines. On manual switchboards of the usual cord type, with the plug-ended cords connected together in pairs for making the usual line-to-line connections, conference connections are usually made through a group of conference jacks, being jacks which are connected in multiple. In such a system, each line of the group in conference is connected to a separate conference jack by a separate cord pair. Irrespective of the number of conference jacks provided, the number of lines which can be connected in conference is thus limited to the number of available idle cord pairs.

A specific object of the invention is to overcome the noted limitation by employing means for interconnecting desired cord pairs in common for conference purposes, whereby each interconnected cord pair may connect two lines (one per cord and plug) into the common conference connection. In carrying out the foregoing specific object, it has been chosen to provide the usual listening key of each cord pair with a conference position and with associated contacts for connecting the cord pair to the commn conference conductors.

Other objects and features will appear as the description progresses.

Referring to the drawing, it has been chosen to illustrate the invention as applied to a small manual switchboard of the magneto type, such as is commonly employed as a portable military switchboard. The drawing accordingly shows in circuit diagram sufficient of the apparatus of such a switchboard incorporating the invention to enable the invention to be understood.

On the drawing, the first, second, and last of the lines are shown at L1, L2, and LL serving the usual magneto telephone stations S1, S2, and SL. Their respective jacks are shown at J1, J2, and JL, together with the usual drops or other desired line signals D1, D2 and DL.

One of the cord pairs (or cord circuits as they are commonly called) is shown at CC, there being as many other similar cord circuits CC as may be desired.

The apparatus at PE is position equipment, being common to the several cord circuits CC. The conductors (CNT, CNR; TA, RA; and RC, TC) extending to cord circuit CC from position PE are connected in multiple to all cord circuits as shown by the multiple symbols and associated note.

*Detailed description*

The invention having been described generally, a detailed description will now be given.

*Arrangement*

The cord circuit CC is one of a group of similar cord circuits. It comprises an answer plug PA and a call plug PC and illustrated apparatus connected therebetween by the usual flexible cords which permit insertion at the plugs into the line jacks J1 to JL.

Cord circuit CC includes a non-ring-through repeating coil 10, interposed between plugs PA and PC, with serially related condensers 18 and 20 which act in aid of the non-ring-through characteristic. Bridged drops DA and DC are for recall and ringoff supervision.

The cord circuit CC has a single key CK, a three-position locking type having contact sets A, B, and C. When the lever of key CK is moved upwardly to its listen position, it locks and activates contact sets A and B. When it is moved down to its conference position, it locks and activates contact set C. With the lever of the key CK in its normal center position, the contact sets are all in their illustrated normal position. The tip T and ring R of answer plug PA are then connected through the conductors of the flexible cord and the back contacts of set A of key CK to the left-hand winding of repeating coil 10, through condenser 18; and the call plug PC is connected through the tip T and ring R conductors of the flexible cord and the back contacts of set B of key CK to the right-hand winding of repeating coil 10, through condenser 20. Thus, the answer plug PA and the call plug PC are normally connected telephonically through repeating coil 10.

In the position equipment PE, the ringing key RK is a three-position non-locking key, having alternative ring-answer and ring-call contact sets A and B, shown in normal position. With these contact sets in normal position, the common conductors TA and RA are connected directly to the operator's telephone OT, and are connected telephonically to the common conductors TC and RC, through condensers 22 and 24 and repeating coil 12, which are similar respectively to items 18, 20, and 10 of CC.

Conductors CNT and CNR are the common conference conductors, common to all cords CC. The conference monitor key MK is provided to connect these leads to the operator's telephone OT for monitoring purposes.

*Normal call*

Assume that the subscriber at station S1, desiring to call station S2, has turned the crank of his generator to operate the drop D1, and has then picked up his receiver; and that the operator upon seeing the signal has inserted the answering plug PA of an idle cord circuit CC into the jack J1—disconnecting the drop D1 from the line L1—and has operated key CK to the listen position. With key CK in the listen position, the circuit between the cords of cord circuit CC is through the position equipment PE; answer plug PA being connected through the front contacts of set A of key CK to leads TA and RA, and call plug PC being connected through the front contacts of set B of key CK to leads TC and RC. The operator's telephone OT, bridged across the answer side of position equipment PE, is therefore connected to station S1 through plug PA, jack J1, and line L1; and the calling subscriber may inform the operator that he desires to call station S2. The operator may then insert the calling plug PC of the cord circuit CC into jack J2, which cuts off the drop D2 of line L2.

Ringing current from generator GEN may be applied through the plugs of cord circuit CC, while key CK is in listen position, by operating key RK. With key RK in the ring-call position, the current is applied through the front contacts of set B of this key, over leads TC and RC, to the call plug PC; and with key RK in the ring-answer position, the current is applied through the front contacts of set A, over leads TA and RA, to the answer plug PA.

The operator may signal S2 by using the ring-call position of key RK. After the subscriber at station S2 answers, the conversation may be carried through cord circuit CC with key CK in normal position; or the position equipment PE may be switched into the circuit, by means of the listen position of key CK, to permit the operator to check the status of the call.

Either subscriber may signal to recall the operator or to ringoff at the end of the conversation by turning his generator crank, causing the drop DA or DC bridged across his side of the cord circuit CC to operate. Upon seeing this signal—or to otherwise check the connection—the operator may listen with key CK in the listen position, and if the connection is no longer desired, pull down the plugs and restore key CK to normal. The cord circuit CC is then available for use in establishing other connections.

*Conference call*

Assume that station S1, desiring to make a conference call to stations S2, SL, and others, has signalled the operator, and that the call has been answered by plugging answer plug PA of cord circuit CC into jack J1 and operating key CK to listen position as described above for a normal call. After obtaining the identity of the stations desired for the conference, the operator calls each station and connects the line thereof to the conference conductors CNT and CNR, along with the line of station S1. To call station S2, the operator may insert call plug PC into jack J2 and ring with key RK in its ring-call position as described. The operator may inform the called subscriber of the conference, when he answers and then operate key CK of cord CC to the conference position. With key CK in the conference position, the two lines L1 and L2 are connected to each other and to the conference multiple conductors, CNT and CNR through the cord circuit CC; the connection to the conductors CNT and CNR being through isolating condensers 14 and 16 and through the contacts of set C of key CK to leads T and R of the answer cord.

The operator may select another idle cord circuit to call another two of the desired stations, inserting the plugs PA and PC into the respective jacks of the lines to the stations. After operating the key CK to the listen position, the operator may ring each station (with key RK in its ring-answer position for the station on the answer side and in its ring-call position for the station on the call side) and inform each subscriber of the conference when he answers. Key CK of the cord circuit should then be operated to the conference position.

Additional cord circuits may then be used, one cord circuit for each two lines, until all the lines to the desired stations are connected; and the key CK of each cord circuit used for the conference is in conference position. Each station is then telephonically connected to each other station, the cord circuits used being connected together by the multiple leads CNT and CNR. Each station has a drop DA or DC connected for selective operation from that station only, which permits a subscriber to signal the operator for any reason, such as to be disconnected from the conference, or to call in additional stations.

To check the status of the call, the operator may connect the operator's telephone OT into the conference by means of monitor key MK. When the connection is no longer desired, which is indicated by observing a drop DA or DC or by listening, the operator may take down the plugs and restore the keys CK to normal.

I claim:

1. In a manual telephone switchboard for interconnecting telephone lines, switchboard cords interconnected in pairs, operator-controlled means for completing a telephone connection through any said pair of cords between any desired two of said lines, an operator's telephone, separate operator-controlled key means for each said pair of cords having a normal position and two operated positions, contact means controlled by any said key means in one said operated position to connect said operator's telephone to the associated pair of cords, conference leads common to all said pairs of cords, other contact means controlled by any said key means in the other said operated position to connect the associated pair of cords to said conference leads.

2. In a manual telephone exchange system according to claim 1, wherein the key means for any pair of interconnected cords comprises a single three-position operator's key having two sets of connecting contacts which are operated responsive to the key being actuated to respective ones of the said three positions.

3. In a manual telephone exchange system according to claim 1, operator-controlled means common to all the pairs of interconnected cords for connecting the operator's telephone to said conference leads.

No references cited.